United States Patent [19]

Mito et al.

[11]  4,370,388
[45]  Jan. 25, 1983

[54] LAMINATED MULTILAYER STRUCTURE

[75] Inventors: Masaharu Mito; Masahiro Koya, both of Iwakuni, Japan

[73] Assignee: Mitsui Petrochemical Industries Ltd., Tokyo, Japan

[21] Appl. No.: 129,192

[22] Filed: Mar. 11, 1980

[30] Foreign Application Priority Data

Mar. 14, 1979 [JP] Japan .................................. 54-28784

[51] Int. Cl.³ ............................................. B32B 15/08
[52] U.S. Cl. ....................................... 428/461; 525/74; 525/77; 525/78; 525/86; 428/462; 428/476.1; 428/476.9; 428/483; 428/516; 428/517
[58] Field of Search ............ 428/483, 461, 520, 476.3, 428/476.9; 525/74, 77, 78, 86

[56] References Cited

U.S. PATENT DOCUMENTS

| | | | |
|---|---|---|---|
| 3,642,746 | 2/1972 | Kashiwa et al. | 260/88.2 |
| 3,644,318 | 2/1972 | Diedrich | 260/88.2 |
| 4,071,674 | 1/1978 | Kashiwa et al. | 526/125 |
| 4,076,698 | 2/1978 | Anderson et al. | 526/348.6 |
| 4,087,587 | 2/1978 | Shida et al. | 428/500 |
| 4,190,477 | 2/1980 | Ossian et al. | 426/126 |
| 4,198,327 | 4/1980 | Matsumoto et al. | 525/74 |

FOREIGN PATENT DOCUMENTS 2658547  8/1977  Fed. Rep. of Germany ........ 525/74

*Primary Examiner*—George F. Lesmes
*Assistant Examiner*—E. Rollins Buffalow
*Attorney, Agent, or Firm*—Sherman & Shalloway

[57]  ABSTRACT

A laminated multilayer structure composed of a grafted high-density polyethylene resin layer directly attached to a layer of a resin selected from the group consisting of polyamide resins, polyester resins saponified copolymers of ethylene and vinyl acetate, or to a metal layer; characterized in that said grafted high-density polyethylene resin layer is composed of (a) 97 to 50 parts by weight, per 100 parts by weight of the resins (a) and (b) combined, of a high-density polyethylene resin having a density of 0.945 to 0.970 g/cm³ and being grafted with an aliphatic dicarboxylic acid or its functional derivative, with or without a high-density polyethylene resin having a density of 0.945 to 0.970 g/cm³, (b) 3 to 50 parts by weight, per 100 parts by weight of the resins (a) and (b) combined, of an ethylene/4-methyl-1-pentene copolymer having an ethylene content of 93 to 99.9 mole % and a melt index at 190° C. of 0.1 to 10 g/10 min., and (c) 0 to 20 parts by weight, per 100 parts by weight of the resins (a) and (b) combined, of a rubbery synthetic polymer or copolymer.

8 Claims, No Drawings

LAMINATED MULTILAYER STRUCTURE

This invention relates to a laminated multilayer structure composed of a grafted high-density polyethylene resin layer directly attached to a layer of a resin such as a polyamide resin, a saponified copolymer of ethylene and vinyl acetate or a polyester resin, or to a metal layer. This structure has an improved bond strength between layers which is conducive to elimination of the trouble of delamination at high temperatures and under severe conditions. It also possesses other superior properties including good rigidity and other mechanical properties, heat stability, transparency, gas-barrier property and steam barrier property, and is useful in the fields of packaging materials, containers, interior and exterior panels of buildings, advertisement panels, etc.

More specifically, this invention relates to a laminated multilayer structure of the above-mentioned construction, in which the grafted high-density polyethylene resin layer contains the following components (a) and (b) as essential ingredients and the following component (c) as an optional ingredient.

(a) 97 to 50 parts by weight, per 100 parts by weight of the resins (a) and (b) combined, of a high-density polyethylene resin having a density of 0.945 to 0.970 g/cm$^3$ and being grafted with an aliphatic dicarboxylic acid or its functional derivative, with or without a high-density polyethylene resin having a density of 0.945 to 0.970 g/cm$^3$.

(b) 3 to 50 parts by weight, per 100 parts by weight of the resins (a) and (b) combined, of an ethylene/4-methyl-1-pentene copolymer having an ethylene content of 93 to 99.5 mole% and a melt index at 190° C. of 0.1 to 10.

(c) 0 to 20 parts by weight, per 100 parts by weight of the resins (a) and (b) combined, of a rubbery synthetic polymer or copolymer.

Attempts have heretofore been made to provide a laminated multilayer structure of a layer of a polyolefin and a layer of another resin such as a polyamide resin, a polyester resin or a saponified copolymer of ethylene and vinyl acetate or a metal layer in which the two layers inherently have poor affinity for each other, by modifying the polyolefins and/or polyamides by various means to increase the adhesive strength between the two layers.

It has been known to increase the adhesive strength in such a multilayer structure by utilizing a high-density polyethylene grafted with an aliphatic dicarboxylic acid or its functional derivative as the polyolefin resin layer. Such a method, however, suffers from the defect that a satisfactory adhesive strength is difficult to maintain over a long period of time and the adhesive strength is insufficient under severe service conditions. Accordingly, it has been suggested to utilize an ethylene polymer or copolymer modified with a special unsaturated fused ring carboxylic acid anhydride as a grafting monomer, or a composition obtained by blending a rubbery or elastomeric component with polyethylene having grafted thereto an aliphatic dicarboxylic acid or its functional derivative to increase the adhesive strength.

For example, U.S. Pat. No. 4,058,647 discloses a laminated resin product composed of (1) a gas-barrier polymer layer of a polyester, a polyamide or a hydrolyzed copolymer of ethylene and vinyl acetate and (2) a modified polyolefin composition layer laminated thereon, wherein said modified polyolefin composition is a mixture of 60 to 97% of a polyolefin which polyolefin comprises 0.1 to 100% by weight of a polyolefin modified with an unsaturated carboxylic acid or the anhydride thereof such that the unsaturated acid or anhydride content is from 0.01 to 10% by weight of the total polyolefin content and wherein an unmodified polyolefin comprises from 99.9 to 0% by weight of the total polyolefin content with 40 to 3% by weight of a rubber component having a Mooney viscosity (50 ML$_{1+4}$, 100° C.) of 40 to 150.

U.S. Pat. No. 4,087,587 discloses an adhesive composition for resin layers or metal layers, which comprises a blend of a high-density polyethylene grafted with a special unsaturated fused ring carboxylic acid anhydride selected from the group consisting of unsaturated a cyclic, carbocyclic, heterocyclic and polycyclic moieties which are fused to at least one carboxylic acid anhydride-containing ring, with a polyethylene resin selected from polyethylene, copolymers of ethylene and alpha-olefins, terpolymers of ethylene, alpha-olefin and diene and mixtures of these resins.

In use at high temperatures, for example in the case of retort pouches for cooking, or under severe conditions, for example in the case of gasoline tanks requiring sufficient impact strength and metal panels, satisfactory adhesive strength cannot be obtained, or the properties of the olefin resin are adversely affected. Accordingly, further improvement has been desired.

The present inventors have made extensive investigations in order to overcome the aforesaid troubles of the prior suggestions, and to provide a laminated multilayer structure having improved adhesive strength and good properties and composed of a grafted high-density polyethylene resin layer directly attached to a layer of a resin such as a polyamide resin, a polyester resin, or a saponified copolymer of ethylene and vinyl acetate or to a metal layer.

These investigations have led to the discovery that a laminated multilayer structure having a layer of a grafted high-density polyethylene resin composition which consists essentially of (a) the aforesaid high-density polyethylene modified by grafting the aforesaid dicarboxylic acid or its functional derivative as a grafting monomer, preferably in combination with the high-density polyethylene resin in the unmodified state, and (b) an ethylene/4-methyl-1-pentene copolymer has various superior properties, such as good rigidity and other mechanical properties, heat stability, transparency, gas-barrier property and steam barrier property as well as markedly improved adhesive strength; and that this structure is free from delamination even when used at high temperature or under severe service conditions, and is useful in the field of packaging materials, containers, interior and exterior panels of buildings, and advertisement panels, thus removing the restrictions which have been imposed on the use of conventional multilayer structures of the aforesaid type.

It is an object of this invention therefore to provide a laminated multilayer structure having superior properties as well as markedly improved adhesive strength.

The above and other objects and advantages of this invention will become more apparent from the following description.

The resin composition which constitutes the layer of grafted high-density polyethylene resin in the laminated multilayer structure of this invention is composed of the aforesaid resins (a) and (b) and optionally the rubbery synthetic polymer or copolymer (c).

The resin (a) is a high-density polyethylene resin having a density of 0.945 to 0.970 g/cm$^3$ and being grafted with an aliphatic dicarboxylic acid or its functional derivative. Preferably, the resin (a) further contains a high-density polyethylene resin having a density of 0.945 to 0.970 g/cm$^3$.

Suitable aliphatic dicarboxylic acids or the functional derivatives thereof include, for example, aliphatic unsaturated dicarboxylic acids having 4 to 6 carbon atoms such as maleic acid, fumaric acid or itaconic acid, and the acid anhydrides, esters, amides, imides, and metal salts of these acids. Maleic acid and its anhydride are preferred.

Specific examples of the functional derivatives of the aforesaid dicarboxylic acids include maleic anhydride, citraconic anhydride, itaconic anhydride, monoethyl maleate, diethyl maleate, monomethyl fumarate, dimethyl fumarate, monomethyl itaconate, diethyl itaconate, maleic monoamide, maleic diamide, maleic N-monoethylamide, maleic-N,N-diethylamide, maleic-N-monobutylamide, maleic-N,N-dibutylamide, fumaric monoamide, fumaric diamide, fumaric-N-monoethylamide, fumaric-N,N-diethylamide, fumaric-N-monobutyl amide, fumaric-N,N-dibutylamide, maleimide, N-butylmaleimide, and N-phenylmaleimide.

Various known methods can be used to graft a grafting monomer to high-density polyethylene. For example, this can be achieved by heating high-density polyethylene, the grafting monomer at high temperatures of, say, 150° to 300° C. in the presence or absence of a solvent with or without a radical initiator. Another vinyl monomer may be present during the grafting reaction. Suitable solvents that may be used in this reaction are benzene, toluene, xylene, chlorobenzene, cumene, and the like. Suitable radical initiators that may be used include t-butyl hydroperoxide, cumene hydroperoxide, diisopropylbenzene hydroperoxide, di-t-butyl peroxide, t-butyl cumyl peroxide, (dicumyl peroxide, 1,3-bis-(t-butylperoxy-isopropyl)benzene, acetyl peroxide, benzoyl peroxide, isobutyryl peroxide, bis-3,5,5-trimethylhexanoyl peroxide, and methyl ethyl ketone peroxide.

In the resin (a) that can be obtained in the aforesaid manner, the amount of the aliphatic dicarboxylic acid or its functional derivative can be suitably selected, but is preferably 0.01 to 10%, more preferably 0.1 to 5%, based on the weight of the grafted high-density polyethylene. The amount grafted is determined by measuring the oxygen content of the graft copolymer by oxygen analysis and the absorption intensities of the graft copolymer near 1710, 1790 and 1860 cm$^{-1}$ by infrared absorption spectroscopic analysis.

The resin (a) composed of the grafted high-density polyethylene with or without unmodified high-density polyethylene contains the grafting monomer in an amount of 0.001 to 10%, preferably 0.01 to 10%, more preferably 0.02 to 5%, based on the weight of the resin (a).

The use of the grafting monomer in the amounts within the above-specified preferred ranges is advantageous to the improvement of adhesive strength.

The resin (b) as an essential ingredient to be used in combination with the resin (a) is an ethylene/4-methyl-1-pentene copolymer having an ethylene content of 93 to 99.5 mole%, preferably 95 to 98 mole%, and a melt index (ASTM D1238-65T) at 190° C. of 0.1 to 10. The resin (b) has a density of preferably 0.910 to 0.945 g/cm$^3$, more preferably 0.920 to 0.935 g/cm$^3$.

The resin (b) can be prepared by a method known per se. For example, it can be prepared by copolymerizing ethylene with 4-methyl-1-pentene in the presence of a Ziegler-type catalyst composed of a transition metal catalyst component and an organometallic compound in the optional presence of an inert hydrocarbon solvent at a temperature of, for example, 100° to 200°, preferably 140° to 200° C., and a pressure of, for example, 5 to 100 kg/cm$^2$, preferably 30 to 100 kg/cm$^2$. Preferably, the transition metal catalyst component used in the above catalyst is a highly active catalyst component capable of yielding at least 10000 g, especially at least 50000 g of the copolymer per gram of the transition metal compound. The resin (b) may be used without removing a catalyst residue containing about 5 to about 100 ppm of metallic components such as V, Ti, Mg, Ca and Si attributed to the catalyst used in the copolymerization.

For example, a compound, especially a halogen compound, of titanium and/or vanadium is preferably used as the transition metal compound. Examples are titanium tetrachloride, titanium trichloride, and a titaniun trichloride complex obtained by reducing titanium tetrachloride with an organometallic compound. These compounds may be combined as such with an organometallic compound to form a catalyst. A catalyst obtained by supporting titanium tetrachloride on a suitable carrier, for example a magnesium compound such as magnesium chloride, magnesium carbonate, magnesium oxide, magnesium hydroxide, magnesium hydroxychloride, and magnesium alkoxy halides, and combining the supported titanium tetrachloride with an organometallic compound is most preferred because it has an especially good polymerization activity.

Organic compounds of metals of Groups I to III of the periodic table, preferably organic compounds of aluminum, are used as the organometallic compound. Examples of the organoaluminum compounds include trialkyl aluminums and dialkyl aluminum halides, particularly dialkyl aluminum chlorides and dialkyl aluminum alkoxides.

Such highly active Mg-containing transition metal solid catalyst components are known, and disclosed, for example in British Pat. No. 1,140,649, and U.S. Pat. Nos. 3,642,746, 3,644,318, 4,076,698 and 4,071,674. These catalyst components can be used in the preparation of the resin (b).

In accordance with this invention, a further increase in adhesive strength can be achieved by incorporating the rubbery synthetic polymer or copolymer (c) further into the composition composed of the resins (a) and (b). Examples of the component (c) are an ethylene/propylene copolymer rubber, an ethylene/propylene/diene copolymer rubber, polyisobutylene rubber, polybutadiene rubber, a styrene/butadiene copolymer rubber, a polychloroprene polymer or copolymer rubber, polyisoprene rubber, chlorinated polyethylene rubber, and mixtures of at least two of these rubbers with each other. Of these, the ethylene/propylene rubber is most preferred. Preferably, the ethylene/propylene rubber has a melt index (measured at 190° C. in accordance with ASTM D1238-65T) of 0.1 to 10, and an ethylene content of 60 to 85 mole%.

The grafted high-density polyethylene resin layer in the laminated multilayer structure of this invention is composed of 97 to 50 parts by weight, per 100 parts by weight of the resins (a) and (b) combined, of the resin (a), 3 to 50 parts by weight, per 100 parts by weight of the resins (a) and (b) combined, of the resin (b), and 0 to 20 parts by weight, per 100 parts by weight of the resins (a) and (b) combined, of the rubbery synthetic polymer or copolymer (c).

The proportion of the resin (a) is preferably 90 to 60 parts by weight, more preferably 85 to 70 parts by weight; the proportion of the resin (b) is preferably 10 to 40 parts by weight, more preferably 15 to 30 parts by weight, both based on 100 parts by weight of the total of the resins (a) and (b).

If the amount of the resin (b) is less than the above-specified lower limit, an improved adhesion to a polyamide resin or other polar resins or a metal cannot be obtained. If it exceeds 50 parts by weight, the adhesion of the resin (b) to the polar resins or a metal can no longer be increased, and in addition, it may degrade the good properties of the modified high-density polyethylene, such as rigidity, and adhesion at high temperature.

In the present invention, the rubber polymer or copolymer (c) can be incorporated in the grafted high-density polyethylene composition in a proportion of up to 20 parts by weight per 100 parts by weight of the resins (a) and (b) combined. Incorporation of the component (c) often results in a further improvement of adhesive properties.

The layer of grafted high-density polyethylene resin in the laminated multilayer structure of this invention is formed of a composition which is a uniform mixture of the resin (a) with or without a high-density polyethylene resin having a density of 0.945 to 0.970 g/cm$^3$, the ethylene/4-methyl-1-pentene copolymer (b), and optionally, the component (c).

Any known means can be used in forming the aforesaid composition. There can be used, for example, a method involving mixing the individual components by a ribbon blender, tumbler, Henschel mixer, etc., a method involving melt-kneading the mixture obtained by the aforesaid method in an extruder, a Banbury mixer, a two-roll mill, a kneader, etc., and a method involving dissolving the individual components in solvents, well mixing the solutions with stirring, and then adding a non-solvent for precipitation.

The aforesaid composition may further include various additives such as antioxidants, ultraviolet absorbers, antistatic agents, pigments, dyes, nucleating agents, fillers, slip agents, lubricants, and fire retardants.

Examples of the antioxidants are 2,6-di-t-butyl-p-cresol, O-t-butyl-p-cresol, tetrakis-[methylene-3-(3,5-di-t-butyl-4-hydroxyphenyl)propionate]methane, β-naphthylamine, and para-phenylenediamine.

Examples of the ultraviolet absorbers are 2,4-dihydroxybenzophenone, 2-(2'-hydroxy-3',5'-di-t-butylphenyl)-5-chlorobenzotriazole, 2-(2-hydroxy-3-t-butyl-5-methylphenyl)-5-chlorobenzotriazole, and bis(2,2',6,6'-tetramethyl-4-piperidine)sebacate.

Examples of the antistatic agents are lauryl diethanolamine, palmityl diethanolamine, stearyl diethanolamine, oleyl diethanolamine, behenyl diethanolamine, polyoxyethylene alkylamines, stearyl monoglyceride, and 2-hydroxy-4-n-octoxybenzophenone.

Examples of colorants including pigments and dyes are carbon black, titanium white, cadmium yellow and copper phthalaocyanine blue.

Examples of the nucleating agents are aluminum p-tert-butylbenzoate, dibenzylidene sorbitol, and aluminum hydroxy-di-p-t-butylbenzoate.

Examples of the fillers are glass fibers, carbon fibers, talc, clay, silica, calcium carbonate, barium sulfate, magnesium hydroxide, calcium hydroxide and calcium oxide.

Examples of the slip agents are stearamide, oleamide and erucinamide.

Examples of the lubricants are calcium stearate, zinc stearate, aluminum stearate, magnesium stearate, and polyethylene wax.

Examples of the fire retardants are antimony oxide, decabromobiphenyl ether, and bis-(3,5-dibromo-4-bromopropyloxyphenyl)sulfone.

The amounts of these other additives may be selected from suitable amounts which do not adversely affect the objects of this invention. For example, based on the total weight of the resins (a) and (b), the suitable amounts are about 0.01 to about 5% by weight for the antioxidants; about 0.01 to about 5% by weight for the ultraviolet absorbers; about 0.01 to about 1% by weight for the antistatic agents; about 0.01 to about 5% by weight for the coloring agents; about 0.01 to about 5% by weight for the nucleating agents; about 0.1 to about 60% by weight for the fillers; about 0.01 to about 1% by weight for the slip agents; about 0.01 to about 1% by weight for the lubricants; and about 0.1 to about 50% by weight for the fire retardants.

The other layer which constitutes the laminated multilayer structure of this invention is a layer of a resin selected from the group consisting of polyamide resins, polyester resins and a saponified copolymer of ethylene and vinyl acetate, or a metal layer.

Examples of such known resins include thermoplastic polyamide resins such as nylon 6, nylon 66, nylon 10, nylon 11, nylon 12, nylon 610, poly-meta-xylylene-adipamide and poly-meta-xylylene sebacamide; thermoplastic polyester resins such as polyethylene phthalate, polybutylene phthalate, polyethylene isophthalate, polybutylene isophthalate, polyethylene terephthalate, polybutylene terephthalate, polyethylene naphthalenedicarboxylate, and polyethylene adipate; and saponified copolymers of ethylene/vinyl acetate such as a saponified ethylene-vinyl acetate copolymer or saponified ethylene/propylene/vinyl acetate copolymer having an ethylene content of 15 to 65 mole%.

The metal layer may be a layer of aluminum, steel, iron, zinc, or tin. For example, it may be a thin plate of metal having a thickness of at least 0.05 mm, or a hollow article such as a steel pipe.

This resin layer may also contain known additives in conventional amounts. Such additives may include, for example, about 0.01 to about 5% by weight, based on the weight of the resin, of antioxidants such as 2,6-di-tert.butyl-p-cresol, O-t-butyl-p-cresol, tetrakis-[methylene-3-(3,5-di-tert.butyl-4-hydroxyphenyl)-propionate]methane, copper naphthenate, p-benzoquinone, trioctyl phosphite, and tributyl phosphite; about 0.01 to about 5% by weight, based on the weight of the resin, of about 0.01 to about 5% by weight of ultraviolet absorbers such as 2,4-dihydroxybenzophenone, 2,2-dihydroxybenzophenone, 2-(2'-hydroxy-3,5-di-tert.butylphenyl)-5-chlorobenzotriazole, 2-(2-hydroxy-3-tert.butyl-5-methylphenyl)-5-chlorobenzotriazole, and bis-(2,2',6,6'-tetramethyl-4-piperidine)sebacate; about 0.01 to about 5% by weight, based on the weight of the resin, of coloring agents such as titanium oxide, cadmium yellow, copper phthalocyanine blue and carbon black; about 0.1 to about 60% by weight, based on the weight of the resin, of fillers such as glass fibers, carbon fibers, talc, clay, silica, calcium carbonate, barium sulfate, magnesium hydroxide, calcium hydroxide and calcium oxide; about 0.01 to about 1% by weight, based on the weight of the resin, of antiblocking agents such as stearamide, palmitylamide and oleylamine; about 0.01 to about 1% by weight, based on the weight of the resin, of slip agents such as steramide, oleylamide and erucamide; about 0.01 to about 1% by weight, based on the weight of the resin, of antistatic agents such as sodium-alkyl.diphenylether.disulfonate; and about 0.1 to about 50% by weight, based on the weight of the resin, of fire retardants such as antimony oxide, decabromobiphenyl ether, and bis-(3,5-dibromo-4-bromopropyloxyphenyl)-sulfone.

The laminated multilayer structure of this invention can be produced by means known per se. For example, it can be produced by melting the individual components in separate extruders, and co-extruding them through a single die near the exist of the extruders. The temperature of the grafted high-density polyethylene resin composition during the co-extrusion is about 140° C. to about 300° C., preferably about 160° C. to about 250° C. The temperature of the polyamide resin to be co-extruded is from its melting point to about 300° C., preferably from a point about 10° C. above its melting point to about 280° C. For example, when the polyamide resin is nylon 6, its temperature during co-extrusion is about 230° to about 300° C., preferably about 240° to about 280° C. The polyester resin being co-extruded may have a temperature ranging from a point 10° C. above its melting point to 300° C., preferably 270° to 280° C.

The saponified copolymer of ethylene and vinyl acetate may have a temperature of from 190° C. to 260° C., preferably 200° to 230° C., during the co-extrusion.

It is also possible to extrude the grafted high-density polyethylene layer onto the aforesaid resin layer. When the metal layer is used, the grafted high-density polyethylene layer may be laminated onto it by such means as press-forming, extrusion laminating, extrusion coating, and powder coating. At this time, the metal layer may be heated, and elevated pressures may be used.

The manner of laminating the grafted polyethylene resin composition layer (layer A) and the resin layer or metal layer (layer B) in the multilayer structure of this invention can be varied. For example, a two-layer laminate may be constructed in which one of the layers A and B is used as an inside layer and the other as an outside layer. Alternatively, a sandwich-type three-layer structure may be made in which either one of the layers A and B is used as an interlayer, and the other is laminated to both sides of the interlayer. Or another resin layer having good adhesion to either layer A or layer B may be used in combination. Examples of the manner of lamination include polyethylene layer/layer A/layer B, layer A/polyamide resin layer B/ethylene-vinyl alcohol copolymer layer, polyethylene layer/-layer A/layer B/layer A, polyethylene layer/layer A/-polyamide layer B/thermoplastic polyester resin layer B, polyethylene layer/layer A/polyamide resin layer B/layer A/polyethylene layer, layer B/layer A/-polyethylene resin layer/layer A/layer B/ and various other modified embodiments including a combination of layer A and layer B.

The laminated multilayer structure of this invention can be used in the form of films, sheets, boards, pipes, hollow containers, etc.

The multilayer structure of this invention has markedly improved adhesive strength, and is free from delamination which has conventionally been encountered during use at high temperatures or under severe conditions. Thus, by taking advantages of the high rigidity, mechanical strength, heat stability, gas-barrier property, steam-barrier property, etc. of the constituent layers, the laminated multilayer structure of this invention can be used suitably in various applications, for example packaging materials for vegetables, meats, dairy products, etc., food packaging materials such as packaging films, containers and cook-in pouches for seasonings, edible oils, medicines, etc., gasoline tanks, drum cans and large-sized containers which require impact strength and oil resistance, and building materials and the like such as interior and exterior finishing or trimming panels of buildings, and advertisement panels.

The following Examples and Comparative Examples further illustrate the present invention. It is to be understood, however, that the present invention is not limited to these Examples unless it departs from the scope of the invention described in the specification and the appended claims.

EXAMPLE 1

Five parts by weight of modified high-density polyethylene [to be abbreviated modified HDPE; obtained by grafting 2.0% by weight of maleic anhydride to high-density polyethylene having a melt index of 7 (determined by ASTM D1238-65T; unit 8/10 min.) and a density of 0.962 g/cm$^3$], 65 parts by weight of high-density polyethylene having a melt index of 0.5 and a density of 0.960 g/cm$^3$ (abbreviated HDPE), and 30 parts by weight of an ethylene/4-methyl-1-pentene copolymer (ethylene content 95.3 mole%) (to be abbreviated EHC-1) having a melt index of 2.5, a density of 0.923 g/cm$^3$, an intrinsic viscosity, measured at 135° C. in decalin solution, of 1.65 dl/g, a metal content (total of Al, Ti and Mg) of 50 ppm (which had been obtained by copolymerizing ethylene with 4-methyl-1-pentene at 145° C. and a pressure of 30 kg/cm$^2$ in hexane using a catalyst composed of titanium tetrachloride supported on magnesium chloride and triethyl aluminum without removing the residual catalyst) were mixed in a tumbler blender, and pelletized in an extruder at 220° C.

The resulting pellets were melted in an extruder, and fed into a co-extrusion die for producing a multilayer sheet while maintaining the resin temperature at 210° C.

Separately, nylon 6 (Amilan CM1011, a trademark of Toray Industries, Inc.) was melted in a separate extruder, and fed into the aforesaid co-extrusion die while maintaining the resin temperature at 250° C. Thus, a two-layer sheet composed of an upper polyethylene composition layer having a thickness of 200 microns and a lower nylon 6 layer having a thickness of 100 microns was formed. A test specimen with a width of 25 mm was cut out from the resulting sheet, and partly delaminated between the polyethylene composition layer and the nylon 6 layer. Then, the peel strength of the two layers was measured at a chuck speed of 100 mm/min. using an Instron tester. The same test was performed in an atmosphere kept at 50° C. by securing the Instron tester to a constant-temperature bath.

EXAMPLES 2 AND 3 AND COMPARATIVE EXAMPLE 1

Example 1 was repeated except that the mixing ratio between HDPE and EHC-1 was changed as shown in Table 1.

EXAMPLES 4 TO 6

Examples 1 to 3 were repeated except that there was used an ethylene/4-methyl-1-pentene copolymer (ethylene content 98.3 mole%) having a melt index of 2.0, a density of 0.936 g/cm$^3$, an intrinsic viscosity of 1.92 dl/g, and a metal content of 40 ppm (to be abbreviated EHC-2) produced in the same way as in Example 1 by varying the ratio between ethylene and 4-methyl-1-pentene fed.

COMPARATIVE EXAMPLES 2 TO 4

Examples 1 to 3 were repeated except that ethylene/propylene rubber having an ethylene content of 80 mole% and a Mooney viscosity at 100° C. of 60 (to be abbreviated EPR). was used instead of EHC-1.

COMPARATIVE EXAMPLES 5 AND 6

Examples 1 and 2 were repeated except that low-density polyethylene polymerized by the high pressure method having a melt index of 4.5 and a density of 0.920 g/cm$^3$ (abbreviated LDPE) was used instead of EHC-1 in Example 1.

COMPARATIVE EXAMPLES 7 AND 8

Examples 1 to 3 were repeated except that an ethylene-hexene-1 copolymer having a melt index of 0.2, a density of 0.937 g/cm$^3$ and an intrinsic viscosity of 2.0 dl/g (to be abbreviated MDPE) was used instead of EHC-1 in Example 1.

The results obtained in Examples 1 to 6 and Comparative Examples 1 to 8 are shown in Table 1.

TABLE 1

| Example (Ex.) or Comparative Example (CEx.) | Constituent ratio | Peel strength (kg/cm) 23° C. | 50° C. |
|---|---|---|---|
| Ex. 1 | HDPE/modified HDPE/EHC-1 = 65/5/30 | 4.4 | 4.0 |
| 2 | HDPE/modified HDPE/EHC-1 = 85/5/10 | 4.0 | 3.4 |
| 3 | HDPE/modified HDPE/EHC-1 = 45/5/50 | 4.25 | 3.5 |
| 4 | HDPE/modified HDPE/EHC-2 = 65/5/30 | 3.8 | 3.2 |
| 5 | HDPE/modified HDPE/EHC-2 = 85/5/10 | 3.7 | 3.1 |
| 6 | HDPE/modified HDPE/EHC-2 = 45/5/50 | 3.1 | 2.2 |
| CEx. 1 | HDPE/modified HDPE = 95/5 | 1.0 | 0.9 |
| 2 | HDPE/modified HDPE/EPR = 65/5/30 | 3.5 | 0.9 |
| 3 | HDPE/modified HDPE/EPR = 85/5/10 | 1.8 | 1.0 |
| 4 | HDPE/modified HDPE/EPR = 45/5/50 | 4.9 | 0.5 |
| 5 | HDPE/modified HDPE/LDPE = 65/5/50 | 2.7 | 2.25 |
| 6 | HDPE/modified HDPE/LDPE = 85/5/10 | 1.9 | 1.7 |
| 7 | HDPE/modified HDPE/MDPE = 65/5/30 | 2.6 | 2.0 |
| 8 | HDPE/modified HDPE/MDPE = 45/5/50 | 2.3 | 1.8 |

EXAMPLE 7

Example 1 was repeated except that a composition composed of 75 parts by weight of HDPE, 5 parts by weight of modified HDPE, 10 parts by weight of EHC-1 and 10 parts by weight of EPR was used.

EXAMPLE 8

Example 1 was repeated except that a composition composed of 55 parts by weight of HDPE, 5 parts by weight of modified HDPE, 30 parts by weight of EHC-1 and 10 parts by weight of EPR was used.

COMPARATIVE EXAMPLE 9

Example 7 was repeated except that LDPE was used instead of EHC-1.

COMPARATIVE EXAMPLE 10

Example 8 was repeated except that LDPE was used instead of EHC-1.

The results obtained in Examples 7 and 8 and Comparative Examples 9 and 10 are shown in Table 2.

TABLE 2

| Run | Constituent ratio | Peel strength (kg/cm) 23° C. | 50° C. |
|---|---|---|---|
| Example 7 | HDPE/modified HDPE/EHC-1/EPR = 75/5/10/10 | 4.0 | 2.1 |
| Example 8 | HDPE/modified HDPE/EHC-1/EPR = 55/5/30/10 | 5.1 | 2.0 |
| Comparative Example 9 | HDPE/modified HDPE/LDPE/EPR = 75/5/10/10 | 2.4 | 1.0 |
| Comparative Example 10 | HDPE/modified HDPE/LDPE/EPR = 55/5/30/10 | 3.3 | 1.1 |

EXAMPLES 9 TO 11 AND COMPARATIVE EXAMPLES 11 TO 13

In each run, modified HDPE, HDPE, LDPE, EHC-1 and MDPE shown in Table 1 were used, and by co-extrusion lamination with a saponified product of an ethylene/vinyl acetate copolymer having an ethylene content of 30 mole%, a degree of saponification of at least 98% and a melt index of 1.2 (abbreviated EVAL) or polyethylene terephthalate (PET for short) a two-layer sheet was prepared. The peel strength of the sheet at 23° C. was measured. The resin temperature in the extruder was 210° C. for EVAL and 270° C. for PET.

TABLE 3

| Run | Constituent ratio | Peel strength (kg/cm) EVAL laminate sheet | PET laminate sheet |
|---|---|---|---|
| Example 9 | HDPE/modified HDPE/EHC-1 = 85/5/10 | 3.4 | 0.5 |
| Example 10 | HDPE/modified HDPE/EHC-1 = 65/5/30 | 3.9 | 0.7 |
| Example 11 | HDPE/modified HDPE/EHC-1 = 45/5/50 | 3.8 | 0.6 |
| Comparative Example 11 | HDPE/modified HDPE = 95/5 | 0.8 | 0.1 |
| Comparative Example 12 | HDPE/modified HDPE/LDPE = 65/5/30 | 2.6 | 0.3 |
| Comparative Example 13 | HDPE/modified HDPE/MDPE = 65/5/30 | 2.5 | 0.3 |

EXAMPLE 12 AND COMPARATIVE EXAMPLE 14

The composition of this invention shown in Table 1 was melt-extruded at 230° C. into between two aluminum sheets (semi-hard, thickness 200 microns, with degreased surfaces) to form a resin layer having a thickness of 5 mm. The assembly was pressed by a pair of press rolls to form a three-layer plate of a sandwich structure having self-supporting property. The peel strength between the aluminum sheet and the resin layer was 5.0 kg/cm. For comparison, a three-layer plate of sandwich structure was prepared in the same way as above except that the resin layer described in Comparative Example 1 was used. The peel strength was 3.7 kg/cm.

EXAMPLE 13

The resin sheet (thickness 20 microns) described in Example 1 was superimposed on the surface of an aluminum sheet having a thickness of 100 microns, and lightly bonded. Two such laminate plates were placed face-to-face at their resin layers, and a layer of molten high density polyethylene (thickness 1.4 mm) was extruded into between the two laminate plates. The assembly was pressed by a pair of press rolls at about 220° C. to produce a three-layer plate. The adhesive strength between the layers was high.

EXAMPLES 14 AND 15 AND COMPARATIVE EXAMPLE 15

The composition of this invention was placed between two steel sheets electroplaced with zinc (thickness 200 microns), and the assembly was press-formed at 200° C. for 10 minutes. The peel strength between the resin layer and the steel sheet was measured, and the results are shown in Table 4.

TABLE 4

| Run | Constituent ratio | Peel strength (kg/cm) |
|---|---|---|
| Example 14 | HDPE/modified HDPE/EHC-1 = 65/5/30 | 8.7 |
| Example 15 | HDPE/modified HDPE/EHC-1 = 45/5/50 | 9.8 |
| Comparative Example 15 | HDPE/modified HDPE/LDPE = 65/5/30 | 6.0 |

What we claim is:

1. A laminated multilayer structure composed of a grafted high-density polyethylene resin layer directly attached to a layer of a resin selected from the group consisting of polyamide resins, polyester resins, saponified copolymers of ethylene and vinyl acetate, or to a metal layer; characterized in that said grafted high-density polyethylene resin layer is composed of
    (a) 97 to 50 parts by weight, per 100 parts by weight of the resins (a) and (b) combined, of a high-density polyethylene resin having a density of 0.945 to 0.970 g/cm$^3$ and being grafted with an aliphatic dicarboxylic acid or its functional derivative, said resin being optionally mixed with a high-density polyethylene resin having a density of 0.945 to 0.970 g/cm$^3$,
    (b) 3 to 50 parts by weight, per 100 parts by weight of the resins (a) and (b) combined, of an ethylene/4-methyl-1-pentene copolymer having an ethylene content of 93 to 99.5 mole% and a melt index at 190° C. of 0.1 to 10 g/10 min., and
    (c) 0 to 20 parts by weight, per 100 parts by weight of the resins (a) and (b) combined, of one member of the group consisting of a rubbery synthetic polymer and copolymer.

2. The multilayer structure of claim 1 wherein said copolymer resin (b) has a density of 0.910 to 0.945 g/cm$^3$.

3. The multilayer structure of claim 1 wherein the amount of the aliphatic dicarboxylic acid or its functional derivative grafted to said high-density polyethylene in said resin (a) is 0.01 to 10% by weight based on the grafted high-density polyethylene.

4. The multilayer structure of claim 1 wherein said resin (a) contains 0.001 to 10% by weight, based on the resin (a), of said aliphatic dicarboxylic acid or its functional derivative grafted to said high-density polyethylene resin.

5. The multilayer structure of claim 1 wherein said aliphatic dicarboxylic acid or its functional derivative is a member selected from the group consisting of unsaturated aliphatic dicarboxylic acids having 4 to 6 carbon atoms, and the acid anhydrides, esters, amides, imides and metal salts thereof.

6. The multilayer structure of claim 5 wherein said aliphatic dicarboxylic acid is maleic acid and said derivative is maleic anhydride.

7. The multilayer structure of claim 1 wherein said rubbery synthetic polymer or copolymer (c) is a member selected from the group consisting of ethylene/propylene copolymer rubber, ethylene/propylene diene copolymer rubber, polyisobutylene rubber, polybutadiene rubber, styrene/butadiene copolymer rubber, polychloroprene polymer rubber, polychloroprene copolymer rubber, polyisoprene rubber, chlorinated polyethylene rubber, and mixtures of at least two of these rubbers with each other.

8. The multilayer structure of claim 1 wherein grafted resin (a) is mixed with a high-density polyethylene resin having a density of 0.945 to 0.970 gm/cm$^3$.

* * * * *